US012173867B2

(12) United States Patent
Hamilton

(10) Patent No.: US 12,173,867 B2
(45) Date of Patent: Dec. 24, 2024

(54) MULTIFUNCTIONAL LIGHT FITTING WITH MODIFIED OPTICAL CHAMBER

(71) Applicant: Patina Lighting Limited, Dun Laoghaire (IE)

(72) Inventor: Gerard Hamilton, Dun Laoghaire (IE)

(73) Assignee: Patina Lighting Limited, Dublin (IE)

( * ) Notice: Subject to any disclaimer, the term of this patent is extended or adjusted under 35 U.S.C. 154(b) by 0 days.

(21) Appl. No.: 18/550,451

(22) PCT Filed: Mar. 15, 2022

(86) PCT No.: PCT/EP2022/056615

§ 371 (c)(1),
(2) Date: Sep. 13, 2023

(87) PCT Pub. No.: WO2022/194818

PCT Pub. Date: Sep. 22, 2022

(65) Prior Publication Data

US 2024/0230064 A1 Jul. 11, 2024

(30) Foreign Application Priority Data

Mar. 15, 2021 (IE) .................................. S2021/0055
Oct. 8, 2021 (IE) .................................. S2021/0176

(51) Int. Cl.

| | |
|---|---|
| ***F21V 15/01*** | (2006.01) |
| ***F21V 5/00*** | (2018.01) |
| ***F21V 9/08*** | (2018.01) |
| ***F21V 19/00*** | (2006.01) |
| ***F21Y 115/10*** | (2016.01) |

(52) U.S. Cl.

CPC ............ *F21V 15/013* (2013.01); *F21V 5/007* (2013.01); *F21V 9/08* (2013.01); *F21V 19/003* (2013.01); *F21Y 2115/10* (2016.08)

(58) Field of Classification Search

CPC .......... F21V 15/013; F21V 5/007; F21V 9/08; F21V 19/003; F21Y 2115/10

See application file for complete search history.

(56) References Cited

U.S. PATENT DOCUMENTS

| | | | | |
|---|---|---|---|---|
| 2006/0146531 | A1 | 7/2006 | Reo et al. | |
| 2015/0124440 | A1 | 5/2015 | Janjua et al. | |
| 2018/0224103 | A1* | 8/2018 | Crandell ............... | F21V 23/008 |
| 2019/0041048 | A1* | 2/2019 | Martin .................... | F21S 2/005 |
| 2021/0071835 | A1* | 3/2021 | Hollander ............... | F21V 23/04 |

* cited by examiner

*Primary Examiner* — Mary Ellen Bowman

(74) *Attorney, Agent, or Firm* — LaMorte & Associates P.C.

(57) ABSTRACT

A multifunctional light fitting (100) comprises an elongate main body extrusion (102). It is generally of a rectangular cross-sectional has at least four faces generally at right angles to each other defining an interior space (112). At least one of the faces has a lens area (116). A second elongate extrusion (120) is operable for use as an elongate gear tray. The second elongate extrusion (120) is engageable within the interior space (112) of the main body extrusion (102) to provide an optical chamber. The second elongate extrusion (120) of the optical chamber includes electric lighting elements (130) to support and provide the desired lighting output for the fitting.

13 Claims, 25 Drawing Sheets

MULTIFUNCTIONAL LIGHT FITTING WITH MODIFIED OPTICAL CHAMBER

This invention relates generally to industrial light fittings and particularly to a range of light fittings or fixtures having modified optical chambers.

BACKGROUND TO THE INVENTION

Lighting or Illumination refers to the deliberate use of light to achieve practical or aesthetic effects. Lighting includes the use of both artificial light sources like lamps and lighting fixtures, as well as natural illumination by capturing daylight.

Indoor lighting is usually accomplished using lighting fixtures which come in a variety of styles for various functions. An important property of light fixtures is the luminous efficacy or wall-plug efficiency, meaning the amount of usable light emanating from the fixture per unit of energy used, usually measured in lumen per watt. The more transparent the lighting fixtures are, the higher efficacy. Shading the light will normally decrease efficacy but increase the directionality and the visual comfort probability. Colour temperature for white light sources also affects their use for certain applications.

Typically, there are four ways of installing or using lighting fixtures, the most common being down-lighting, with fixtures on or recessed in the ceiling, casting light downwards. Second, not so common, being up-lighting, which often uses a diffuse surface to reflect light in a space and minimize disabling glare. The remaining, also quite common ways, are front-lighting and back-lighting where the former tends to make the subject look flat as it casts almost no visible shadows while the latter is used to illuminate a background or a backdrop.

The light fittings or lighting fixtures available in the market, offered through various manufacturers have some technical gaps and fail to provide specifications complying with the demand of challenging workspaces like pharmaceutical and semi-conductor facilities.

The multifunctional lighting has not been commercially manufactured before, where a multi-functional litho- and white-light fitting has been developed, with a removeable optical heat sink, that allows transition from amber to white and white to amber without the need for additional parts. The additional features, in terms of increased efficiency, POE as an option and controls, are simply an enhanced functionality. The key secret to this invention is the complete flexibility, to allow up light/downlight with various optical distributions, with the use of a single linear, multi-positional optical heat sink.

The present invention provides a novel range of light fittings or lighting fixtures having modified linear extruded optical chambers to address numerous requirements of the users at different facilities in a single flexible and multifunctional design. To arrive at the present range of light fittings or lighting fixtures, the inventors have performed detailed calculations and simulations including 3-D imaging together with electronic and technical assessments to conform the product design with maximum benefits.

SUMMARY OF THE INVENTION

The present invention provides a multifunctional light fitting comprising an elongate main body extrusion, which is generally of a rectangular cross-section having at least four faces generally at right angles to each other defining an interior space with at least one of the faces having a lens area;

- a second elongate extrusion operable for use as an elongate gear tray;
- the second elongate extrusion being engageable within the interior space of the main body extrusion to provide an optical chamber;
- the second elongate extrusion or gear tray of the optical chamber including electric lighting elements to support and provide the desired lighting output for the fitting.

Preferably, the second elongate extrusion or gear tray is removable from the internal space of the elongate main body extrusion for maintenance or repair of the electrical lighting elements.

Ideally, the elongate main body extrusion has two separate interior spaces, each of which has support ledges for a second elongate extrusion or gear tray, with electric lighting elements, whereby a lighting output can be provided for each interior space or both if required.

Advantageously, the or each interior space is provided with elongate support ledges and the or each second elongate extrusion or gear tray is provided with complementary engageable elongate channels.

Conveniently, the second elongate extrusion or gear tray has at least two upstanding lugs, the light fitting further comprising a cover plate having complementary support legs which engage with the upstanding lugs.

The present invention provides multifunctional light fittings or lighting fixtures having modified optical chamber profiles thereby encompassing a range of desirable features and functionalities in a single product design.

Preferably, the light fittings or lighting fixtures according to the invention have flexible layout design catering to different mounting requirements like recessed, suspended or surface mounted depending upon the requirement of the workspace. In one aspect of the invention, the light fittings comprise a range of linear extruded optical chamber profiles fitted with one or more LED collimated light source(s).

Preferably but not limited to, the linear extruded optical chamber profile is made from aluminium.

The layout and profiling of the extruded optical chamber forming a part of the light fitting solutions is such so as to provide excellent luminous as well as thermal efficiencies.

The numerous advantageous aspects of the light fitting solutions according to the invention are:

- Both up-light and down-light functions integrated in one product;
- Fitted with collimated optics having a range of distributions;
- Fitted with amber or spectrum specific lenses to provide desired wavelengths of light;
- Having flexible layouts or designs thereby being able to transition from standard white light to spectrum controlled light, without alterations to the fitting or fixture but simply by relocating the extruded optical chamber;
- Having the ability to be controlled by sensors thereby setting the fittings or fixtures to site specific requirements;
- Having the flexibility to be operated with both mains power supply or power over ethernet;
- Having the ability to be connected and disconnected quickly and instantly;
- Having the capability for walk on ceiling applications;
- Flexibility to be used as an emergency lighting fixture in the event of a power failure; and Having a slim and narrow design to ensure optimum air flow return in controlled environments.

In one preferred embodiment of the invention, the optical chamber or heat sink is provided with an extruded anodized profile, designed in a manner so as to accept various optical distributions.

The design, layout and profiling of the said extruded optical chamber allows the same to be presented to the main extrusion by means of more than one track or locating positioner.

Preferably, each of the locating positioners correspond to multiple different positions for inserting the extruded optical chamber within the main extrusion either in down-light plane or up-light plane. Additionally, owing to the possible multiple positioning of the extruded chamber in the main extrusion, different wavelengths and resultant colours of light like white, amber etc. can be generated.

In another preferred embodiment, the profiling of the extruded optical chamber of the light fittings or lighting fixtures allows the same to lock optical lenses in place, consequently allowing the LED diodes to be collimated therein.

In yet another preferred embodiment, to suit the requirement of a highly specialized industry, for example the semi-conductor industry, an amber lens can be fitted in the optical chamber together with the collimated optic lens, thereby providing a spectrum-controlled light fitting.

In yet another preferred embodiment, a sensor is fitted together with the extruded optical chamber in the light fitting solution to control site specific requirements.

In order to fulfil different requirements depending upon the workspace, the light fitting solutions or lighting fixtures having extruded optical chamber according to the invention can be made to change their configuration by changing the positioning of the optical chamber within the main fitting body.

The optical chamber can be easily removed from the main extrusion by releasing the end cap, unplugging the LED light way and sliding out the chamber. Subsequently, the optical chamber can be raised or lowered to precise positions withing the main fitting body depending upon the light requirements, i.e., amber to white and vice-versa. In addition, the optical chamber can also be positioned in accordance to the requirement for an up-light facility or a down-light facility.

Therefore, the fittings as per the present invention allow great flexibility to the customer within a single product covering diverse applications and capable of being easily adjusted on site without any need for manufacturing skills.

Advantageously, the fittings can be designed as different variants including a multifunctional variant known as MF version and a troffer variant known as TF version. The MF version can be surface mounted or suspended and used in various applications including, but not limited to, cleanrooms, support areas, maintenance areas etc. The TF version is a walk-on fitting and installed in aluminium walk-on ceiling grids which are typically used in fabrication plants making silicon chips.

In a modification of the invention, the light fitting is provided with a removable gear train which is removable from the upper surface of the light fitting.

The scope of the present invention is not limited to just the preferred embodiments but includes all the plausible variants notably those concerning the materials used for the construction of the light fitting solutions or lighting fixtures, optical chamber as well as the positioning of the optical chamber within the main fitting body as per the light requirements of the space.

Figure 13A:
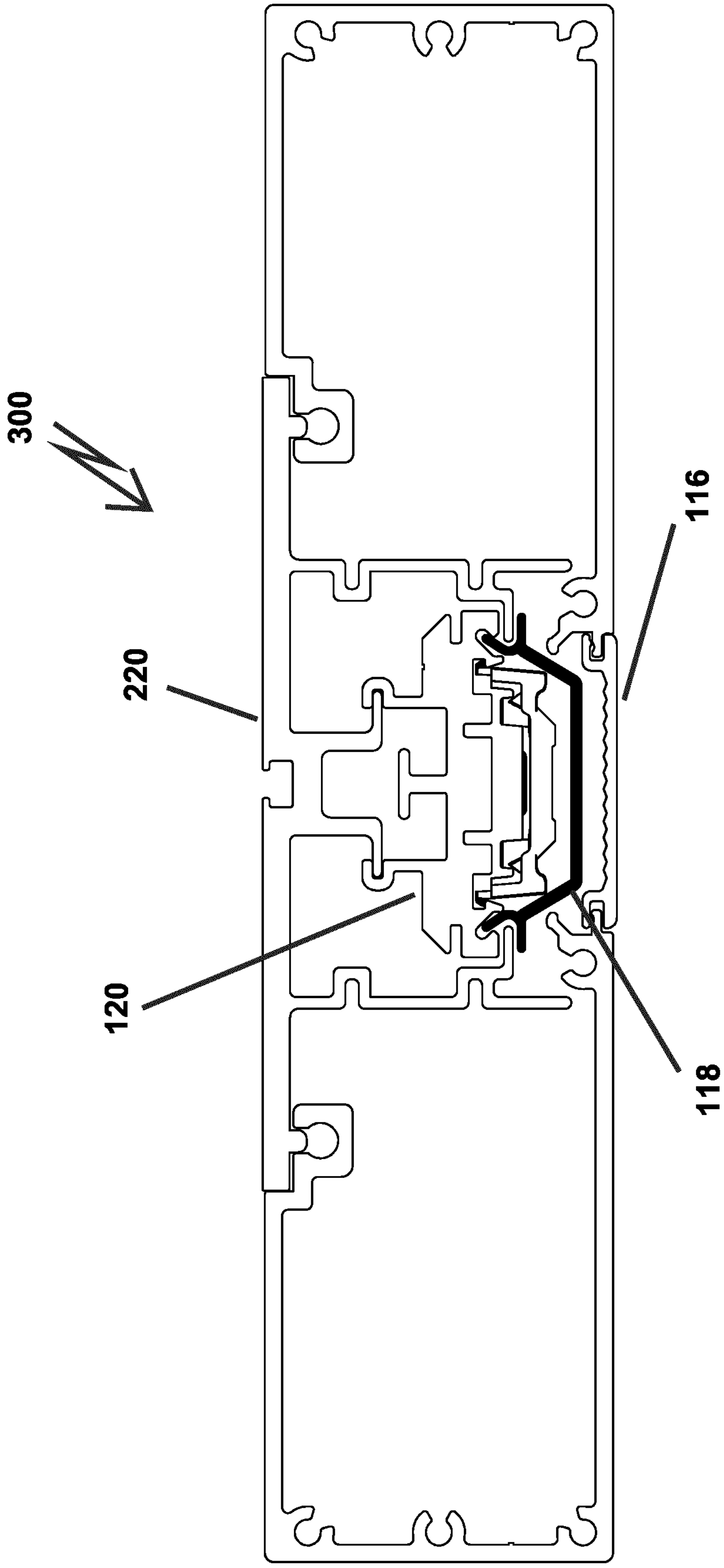
FIG. 13 is a cross-sectional end view of a third embodiment of light fitting which is a wide troffer fitting.
Figure 13B:
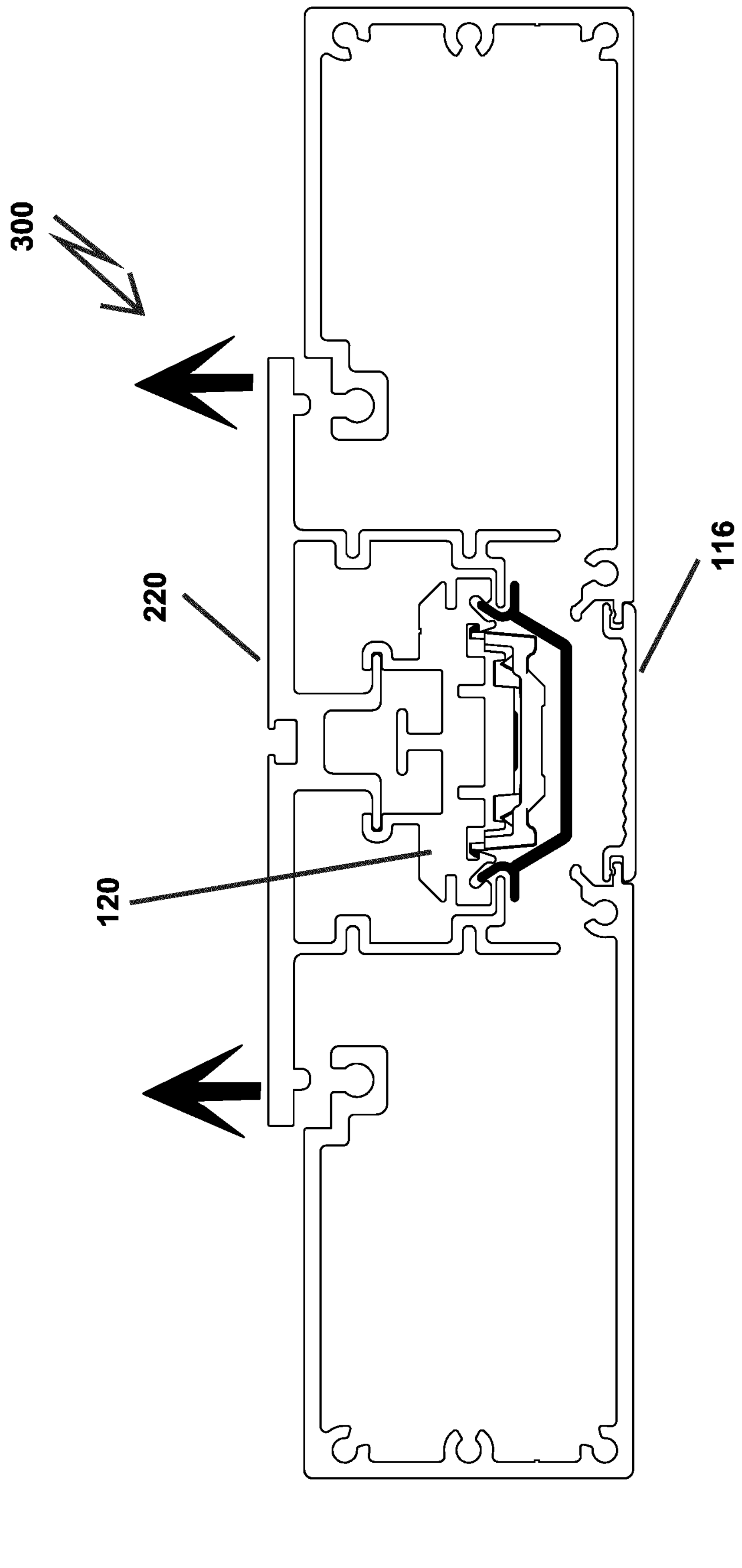
Figure 13C:
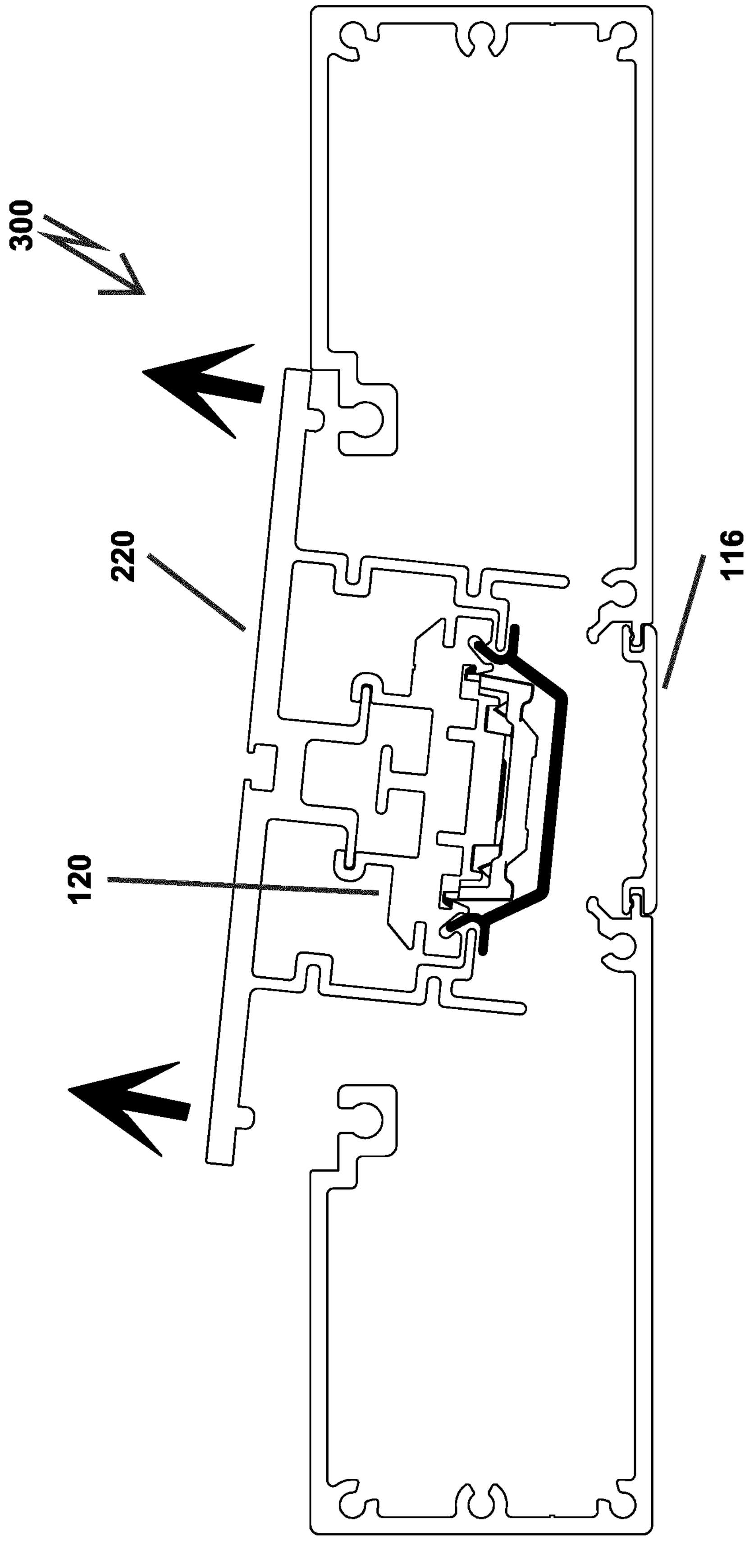
Figure 13D:
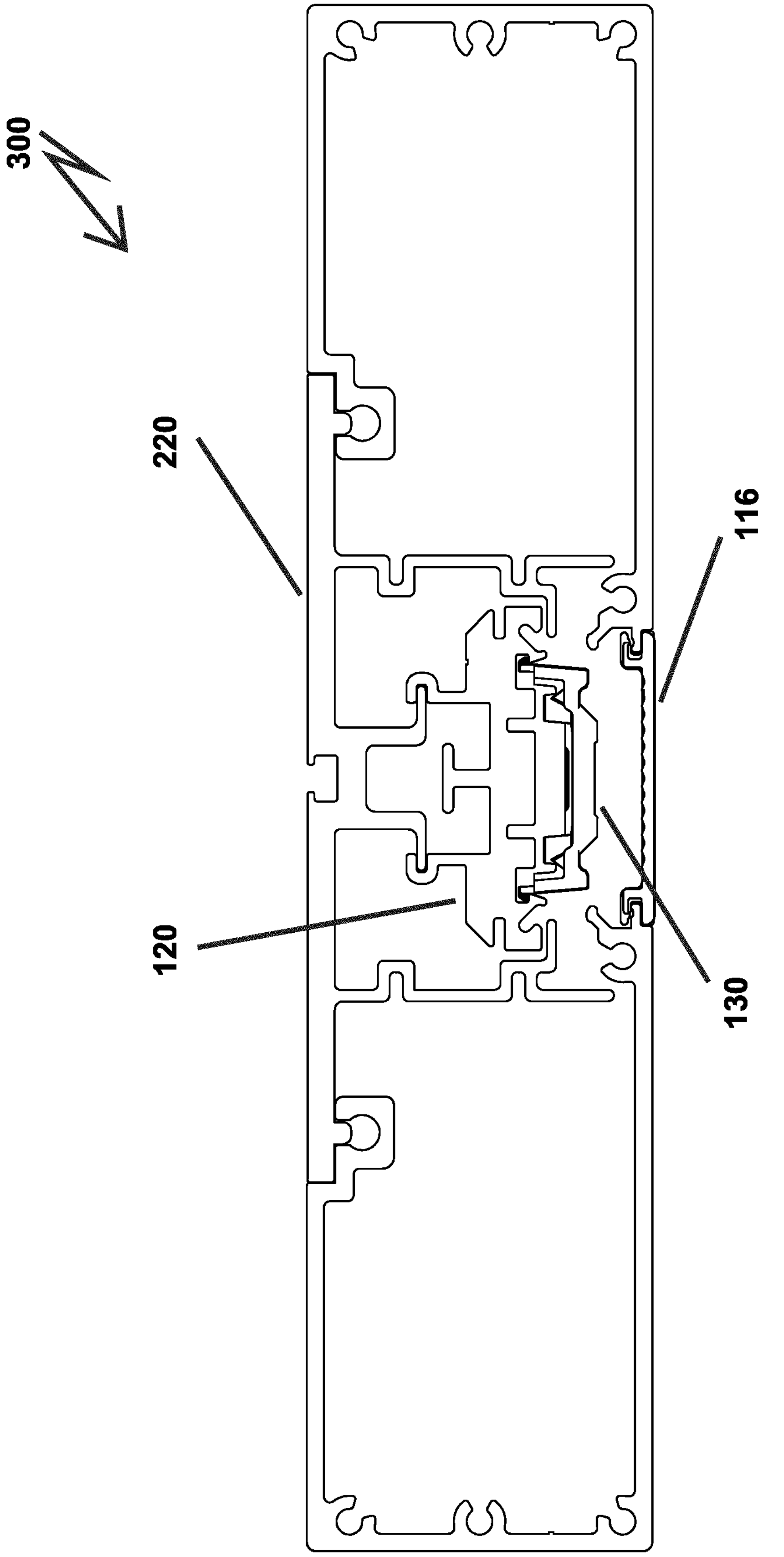
Figure 13E:
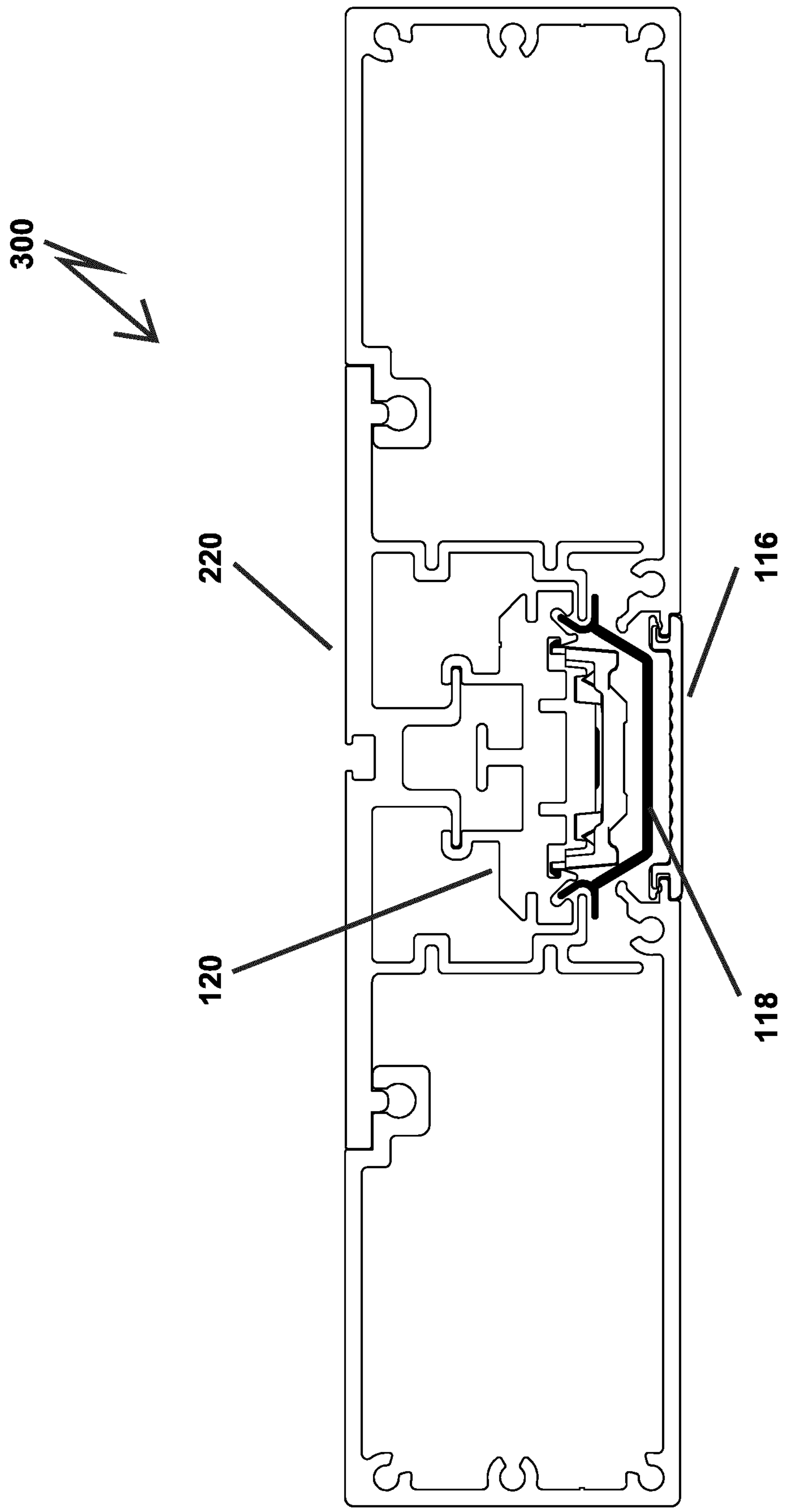
Figure 14A:
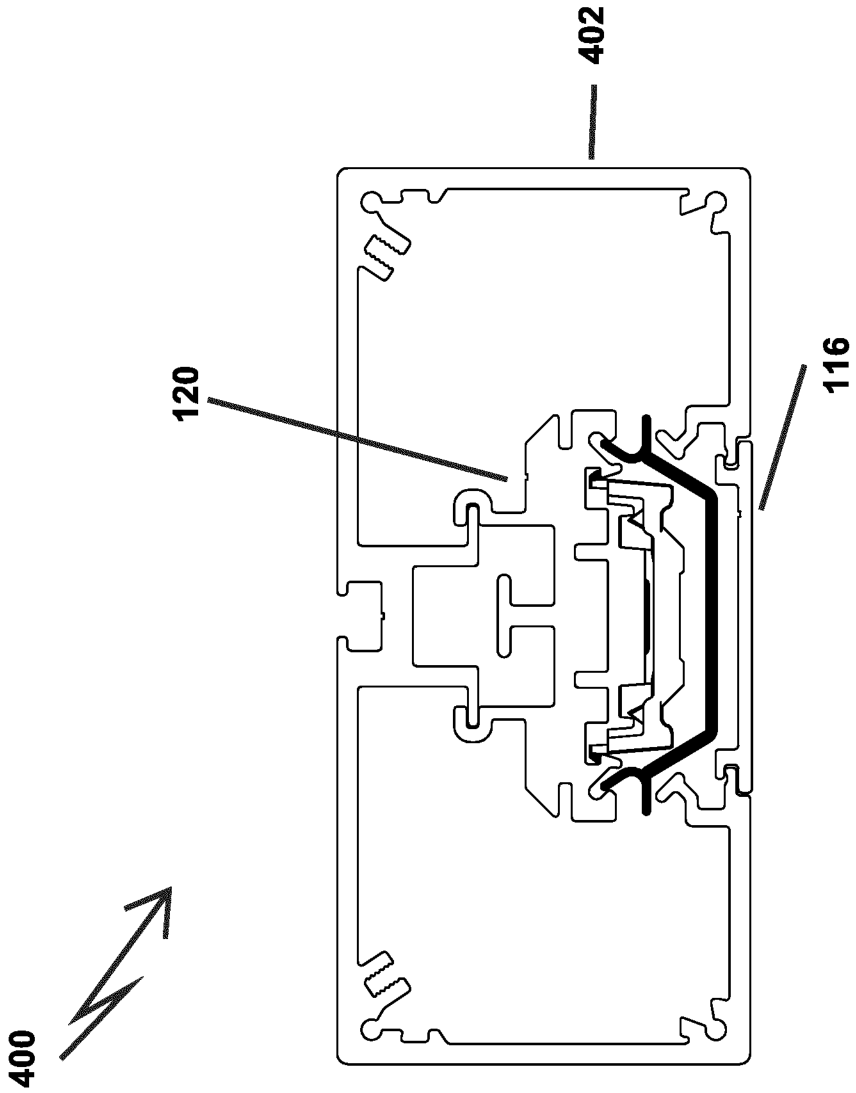
Figure 14B:
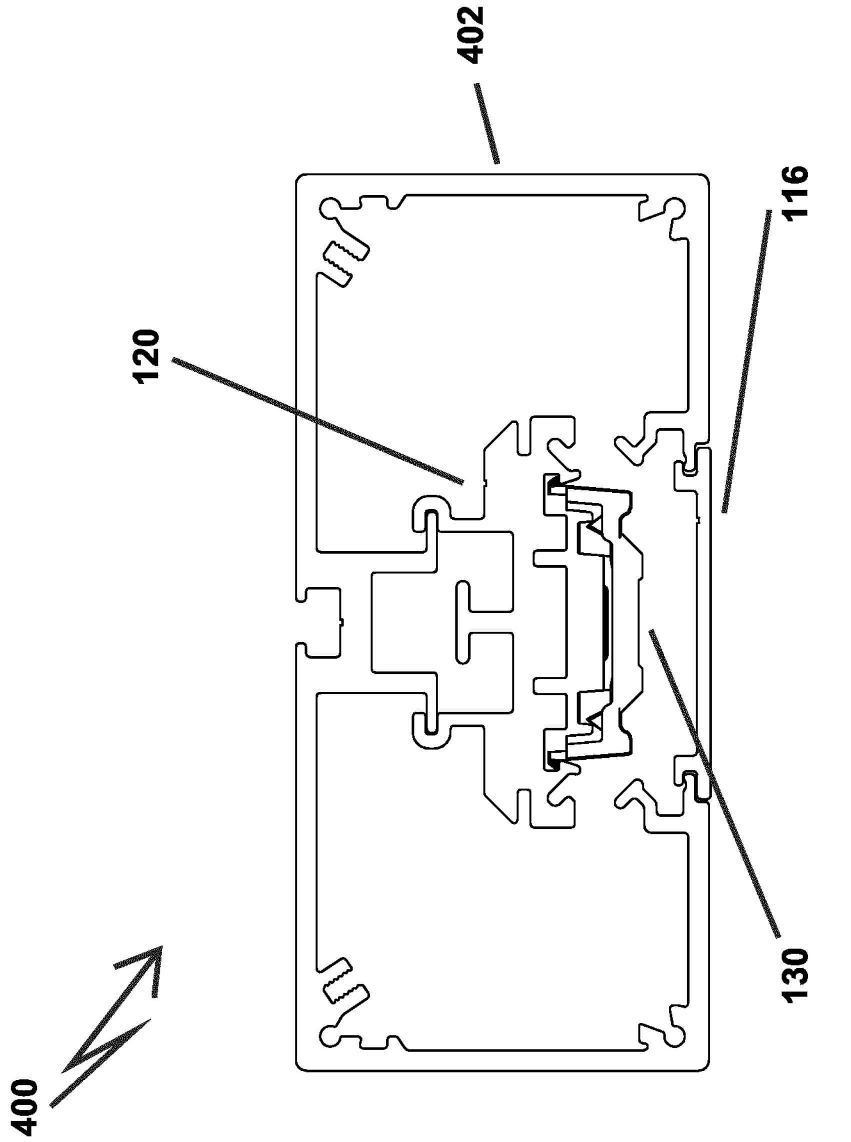

Fitting 13A, 13B and 13C show a series of three cross-sectional end views of the wide troffer fitting showing the sequence of how the gear tray is removed from the light fitting;

FIG. 13D is a cross-sectional end view of the wide troffer fitting in a white light output arrangement;

FIG. 14A is a cross-sectional end view of a fourth embodiment of a one-piece main body of a light fitting which is a narrow troffer fitting arranged to provide an amber output; and FIG. 14B is a similar view to FIG. 14A but is arranged to provide a white light output.

DETAILED DESCRIPTION

The invention will hereafter be more particularly described with reference to the accompanying drawings, which show by way of example only, preferred embodiments of light fitting solutions or lighting fixtures having an extruded gear tray according to the invention at different positions within the main fitting body as well as combined with different lenses depending upon the lighting requirement of a site.

Referring to FIGS. 1 to 7 of the drawings, the first embodiment of light fitting 100 is a multi-functional (MF) light fitting which can be assembled or modified to produce down lighting or up lighting separately or together in a white or amber light output.

Figure 1:
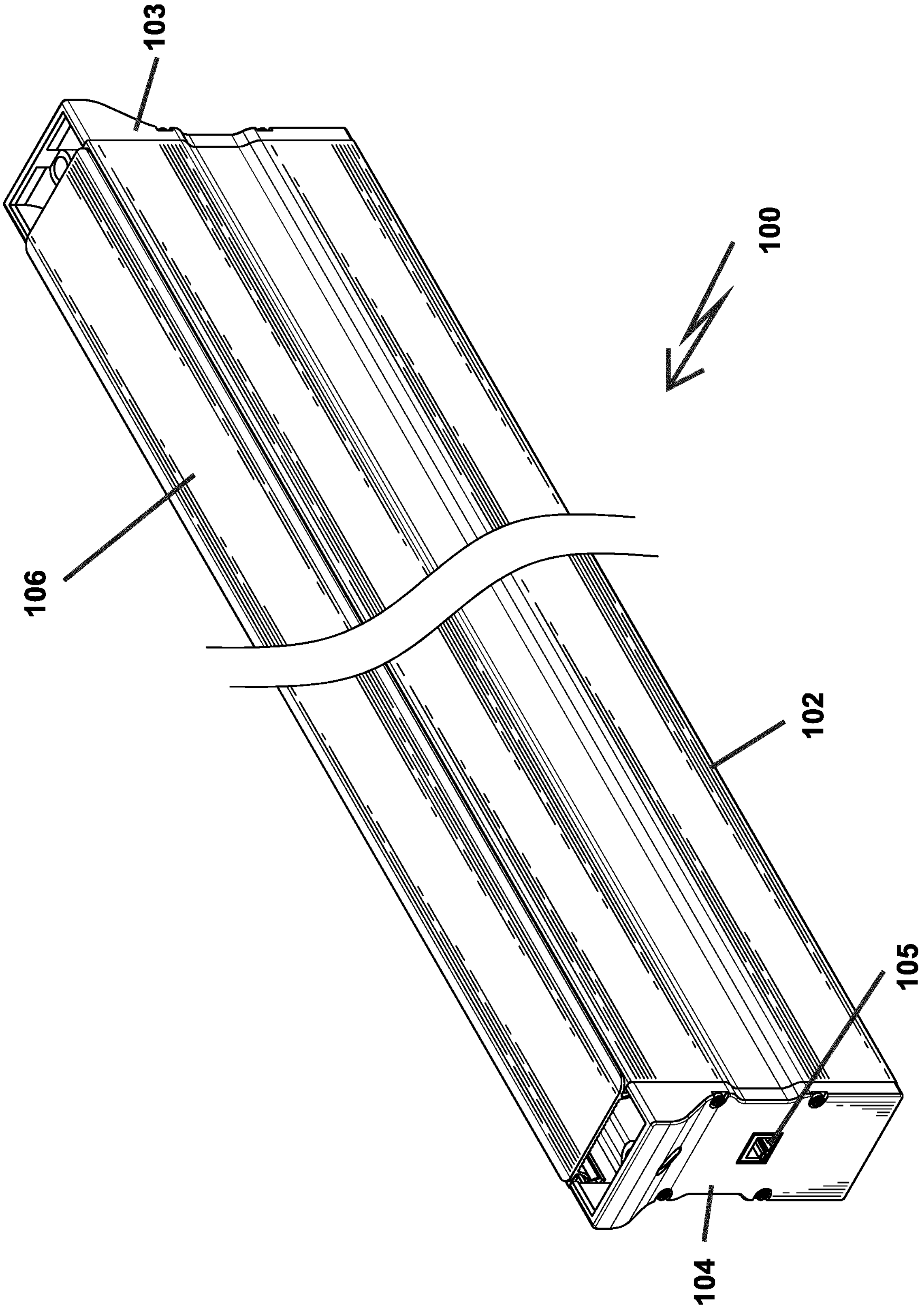
FIG. 1 is a perspective view of a first embodiment of light fitting according to the invention, the light fitting being a multi-functional (MF) light fitting which can be adjusted to provide down lighting or up lighting in a white or amber output.
Figure 1A:
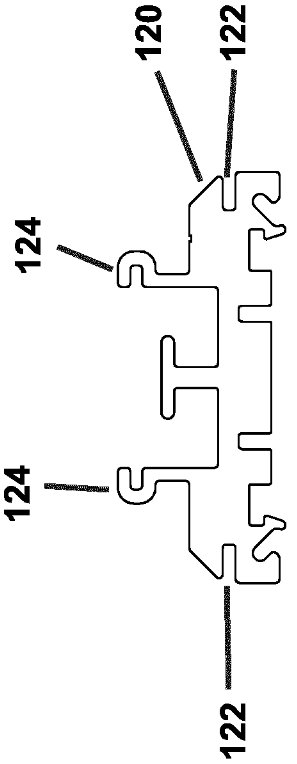
FIG. 1A is a cross-sectional end view and FIG. 1B is a perspective view of an elongate gear tray support element which is included in the light fitting of FIG. 1.
Figure 1B:
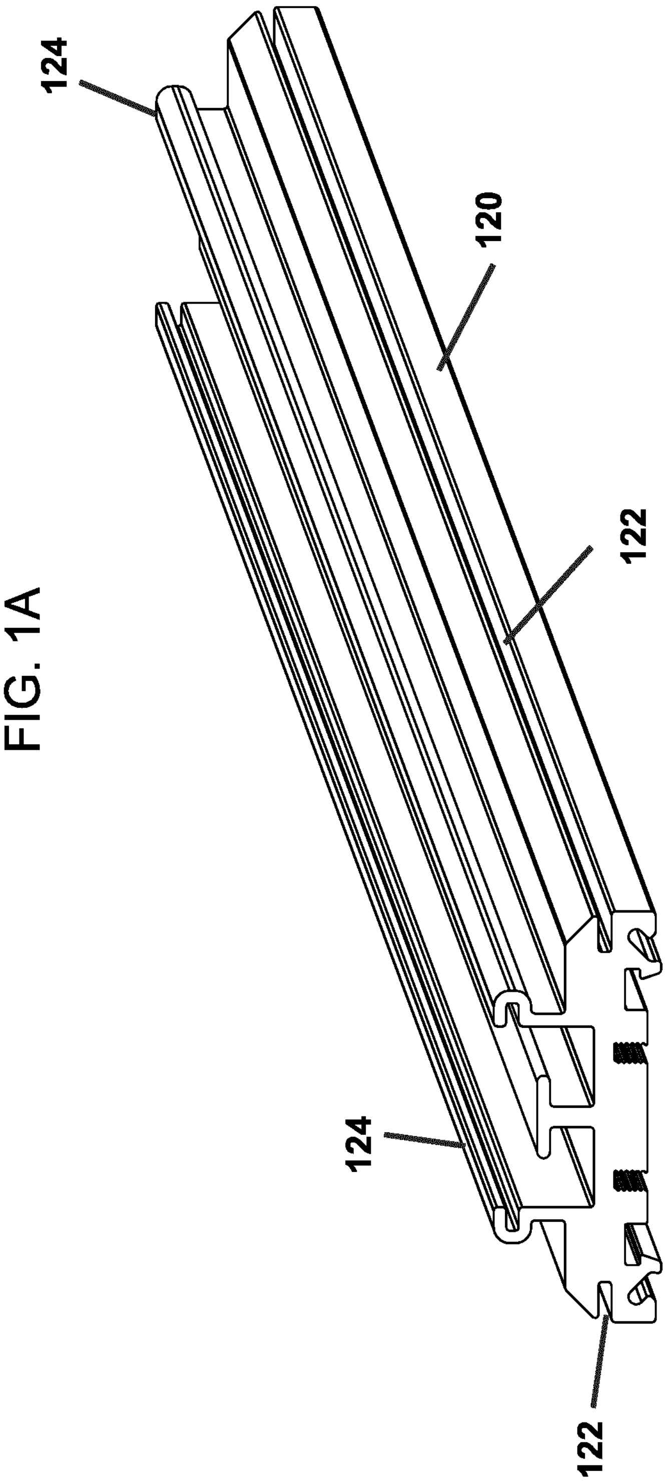

The light fitting 100 combines an elongate extruded main body 102, two end pieces 103 and 104. As shown in FIG. 1, the end piece 104 includes an ethernet connection 105. Other electrical connections can also be used but these are not shown in the drawings. A cover plate 106 is placed on the upper portion of the main body to block off the up-lighting section when not required.

Figure 2B:
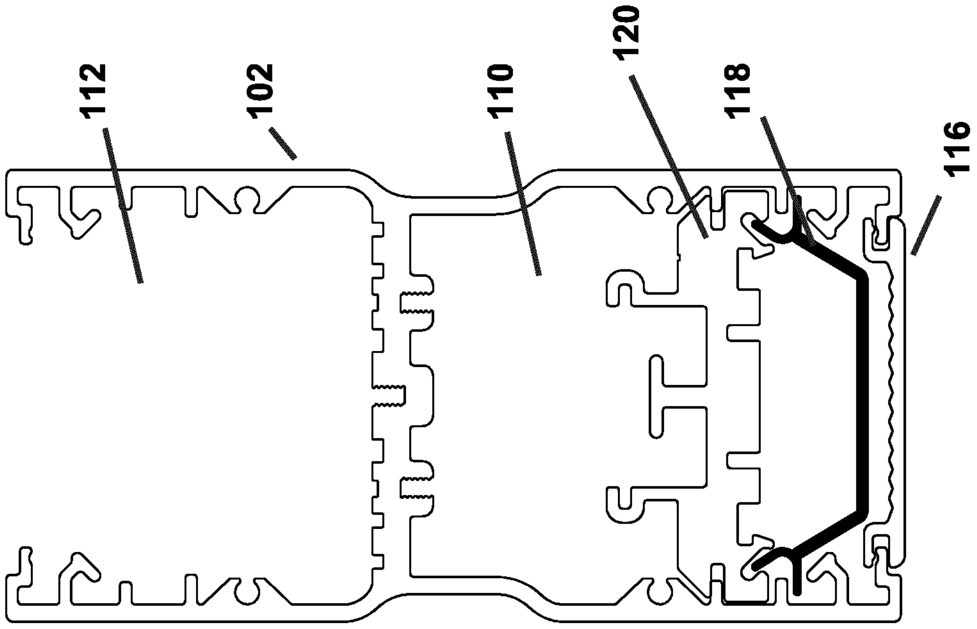
FIG. 2B is similar to FIG. 2A but is provided with an amber lens so as to provide an amber down lighting effect.
Figure 2A:
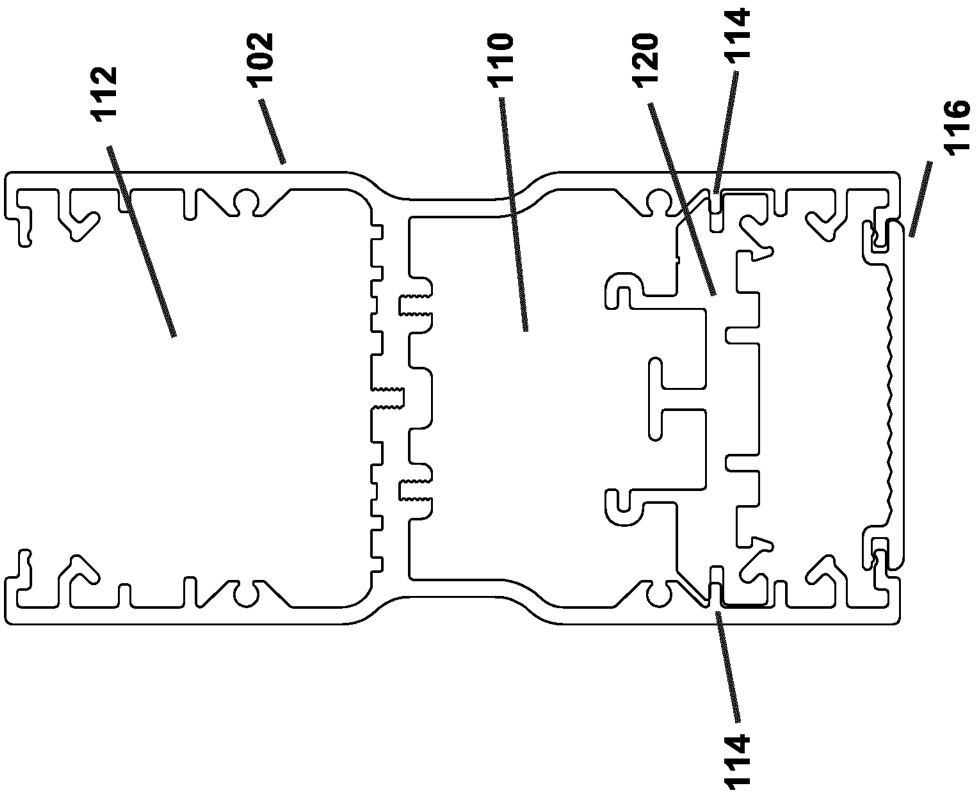
FIG. 2A is a cross-sectional end view of the extruded main body of the light fitting of FIG. 1 in which the gear tray support element is located in a down lighting orientation with a clear prismatic lens at the base of the main body.
Figure 3B:
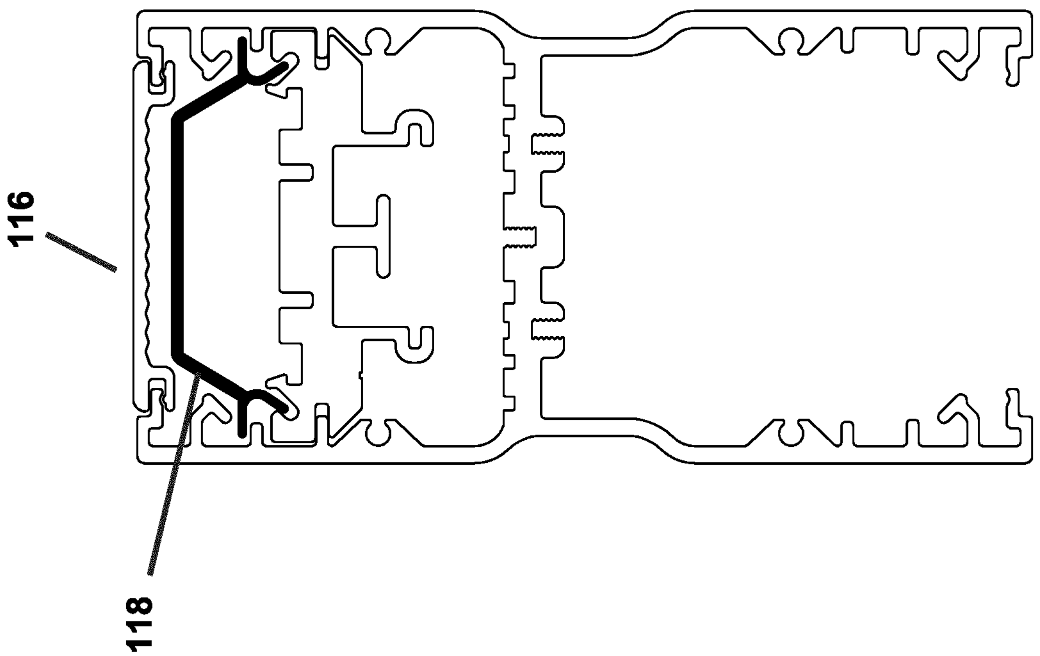
FIG. 3B is similar to FIG. 3A but is provided with an amber lens so as to provide an amber up lighting effect.
Figure 3A:
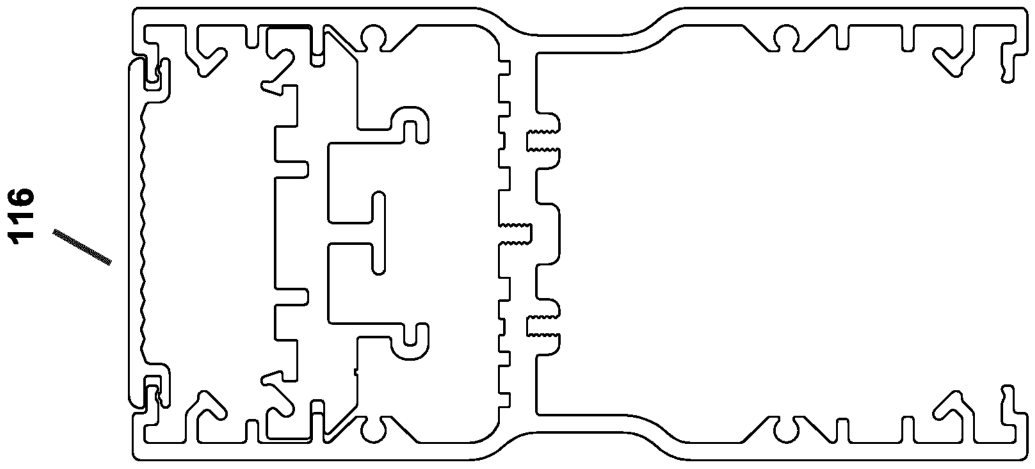
FIG. 3A is a cross-sectional end view of the extruded main body of the light fitting of FIG. 1 in which the gear tray support element is located in an up lighting orientation with a clear prismatic lens at the upper end of the main body.
Figure 4A:
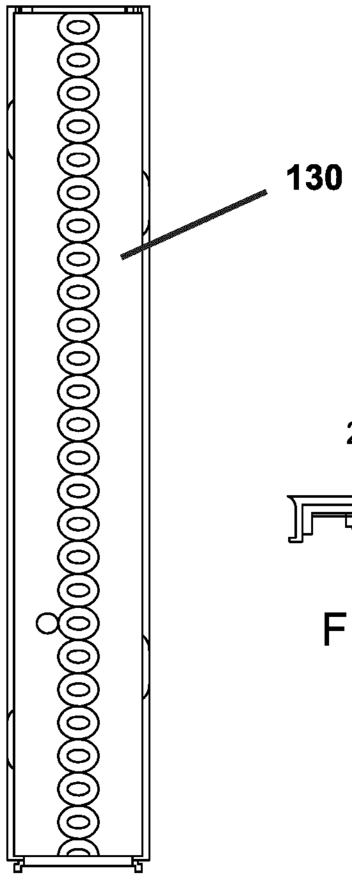
FIG. 4A is an underneath plan view of the unit shown in FIG. 1 showing a collimated lens.
Figure 4B:
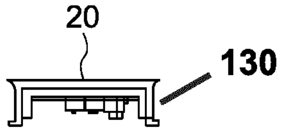
FIG. 4B is a cross-sectional view through the collimated lens of FIG. 4B
Figure 4C:
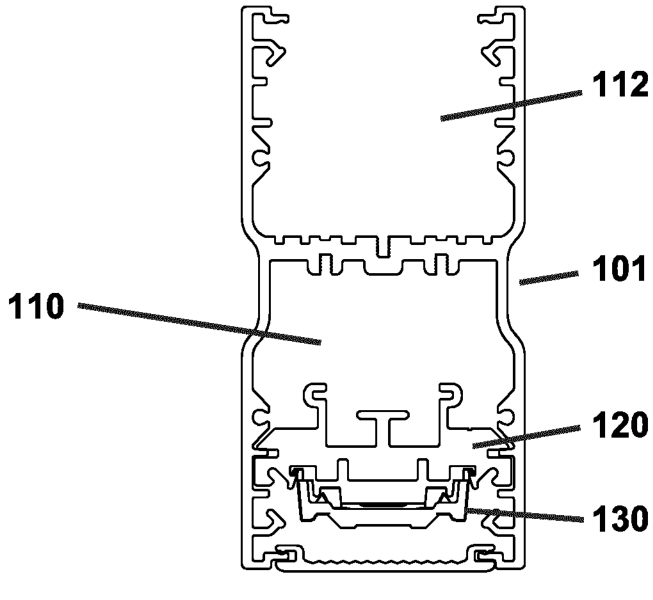
FIG. 4C is a view similar to FIG. 2A but with an additional lens mounted on the gear tray support element.
Figure 5A:
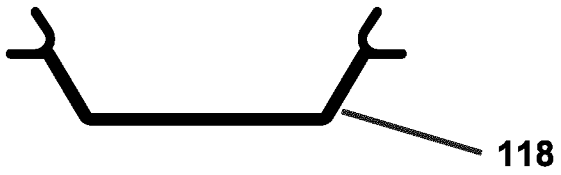
FIG. 5A is a cross-sectional view of the amber lens shown in FIGS. 2A and 3A and FIG. 5B is a cross-sectional view of the clear prismatic lens shown in FIGS. 2 and 3.
Figure 5B:
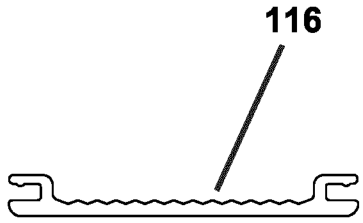
Figure 6B:
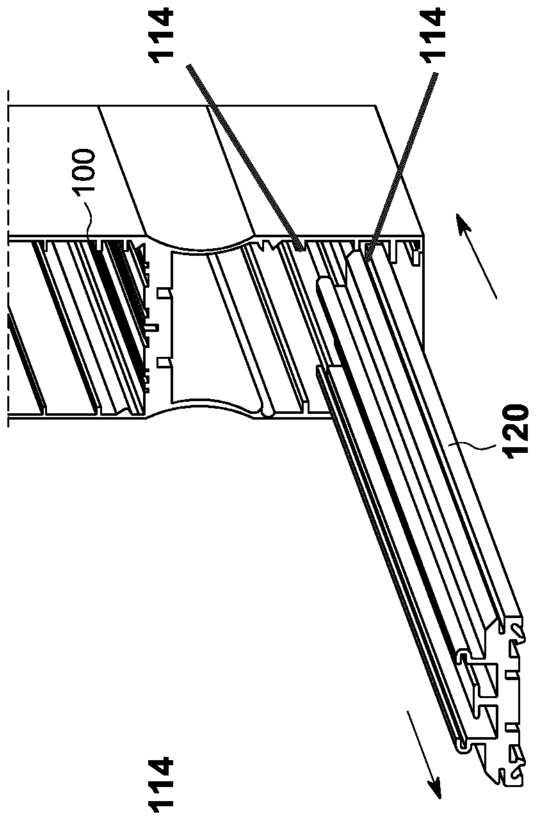
FIGS. 6A and 6B are two extruded perspective views showing how the elongated gear tray element can engage with the main body at different levels depending on the level of lighting required.
Figure 6A:
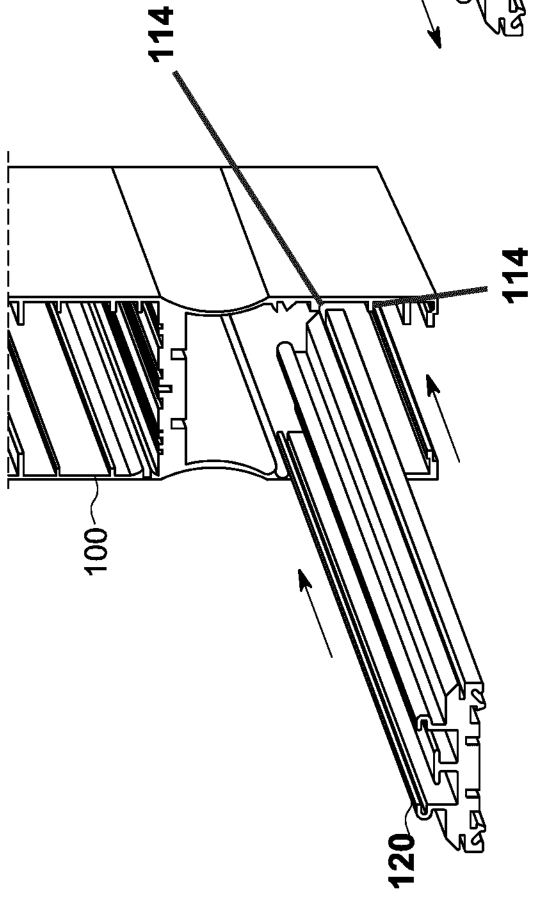

The main body extrusion 102 is provided with two separate sections a lower section 110 and an upper section 112. The lower section 110 is used to contain the elements to provide down lighting and the upper section 112 is used to contain the elements to provide up lighting. These elements comprise an elongated gear tray 120 which supports the lighting element 130 such as LED's or the like. As shown in FIGS. 2A and 2B, channels 122 of the elongate gear tray 120 are engaged with internal ledges 114 of the lower section 110 to provide for down lighting and as shown in FIGS. 3A and 3B the channels of the elongated gear tray 120 are engaged with the internal ledges 116 of the upper section 112 to provide for up lighting. A clear prismatic lens 116 is provided on the lower section 110 or the upper section 112 as required. As shown in FIGS. 2B and 3B, a diffuser 118 is also attached to the gear tray 120 where it is desired to have a light output which is not white but coloured with an amber light.

Figure 7A:
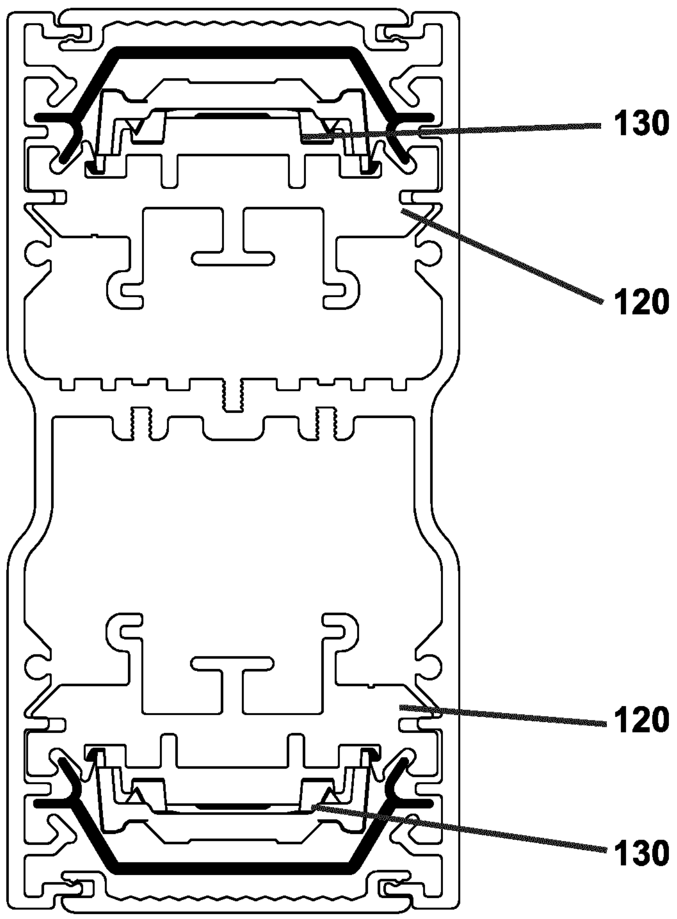
FIG. 7A is a cross-sectional view of through the main body of the fitting which is set up to provide both up lighting and down lighting with an amber output.
Figure 7B:
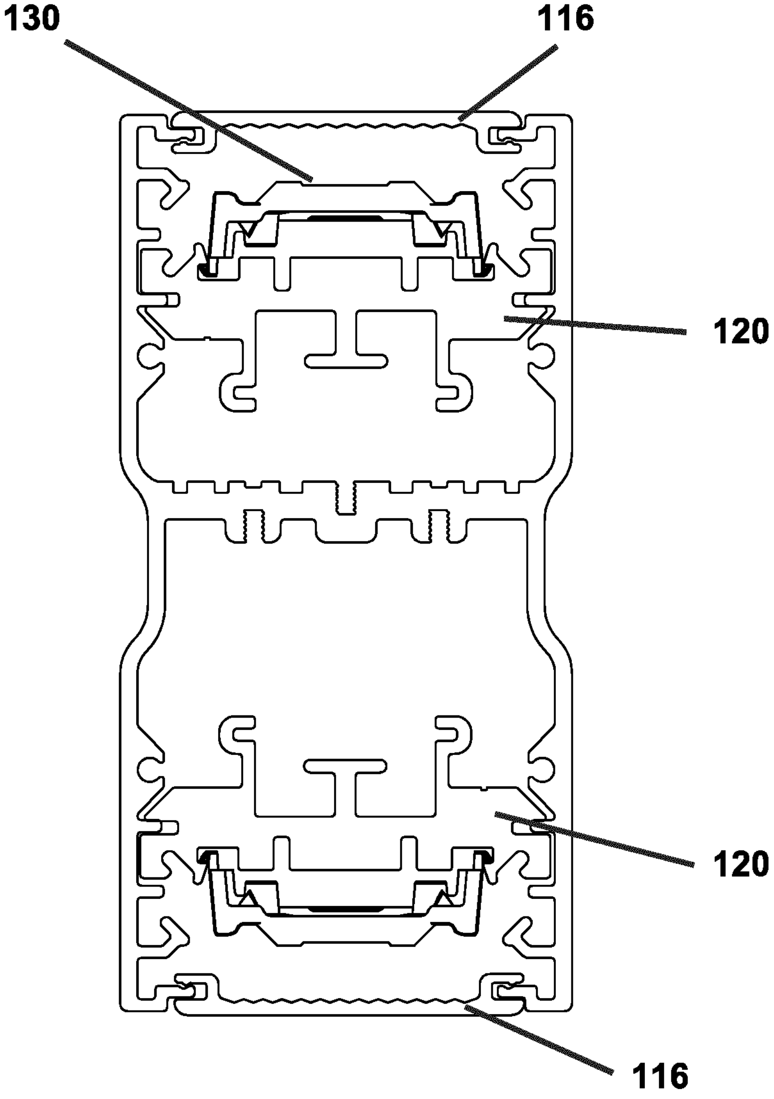
FIG. 7B is a cross-sectional view through the main body of the fitting which is set up to provide both up lighting and down lighting with a clear output.
Figure 8:
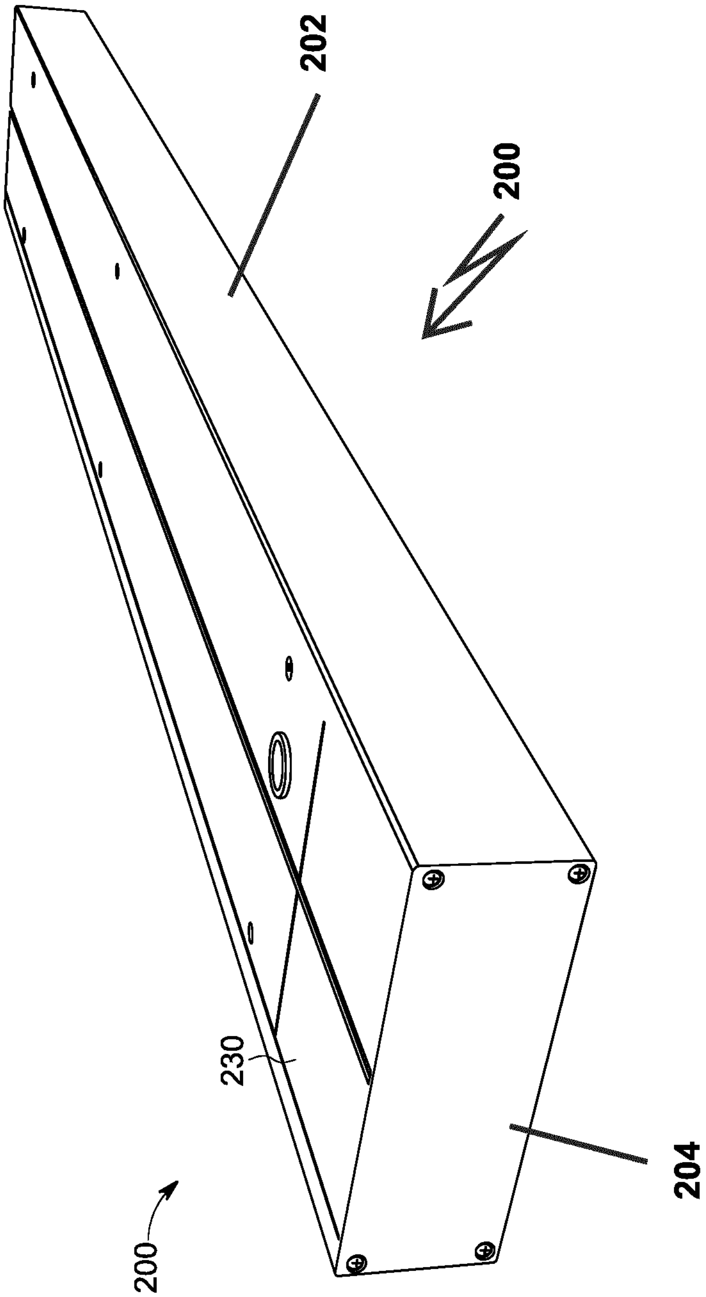
FIG. 8 is a perspective view of a second embodiment of light fitting according to the invention, the light fitting being a troffer fitting (TF)
Figure 9:
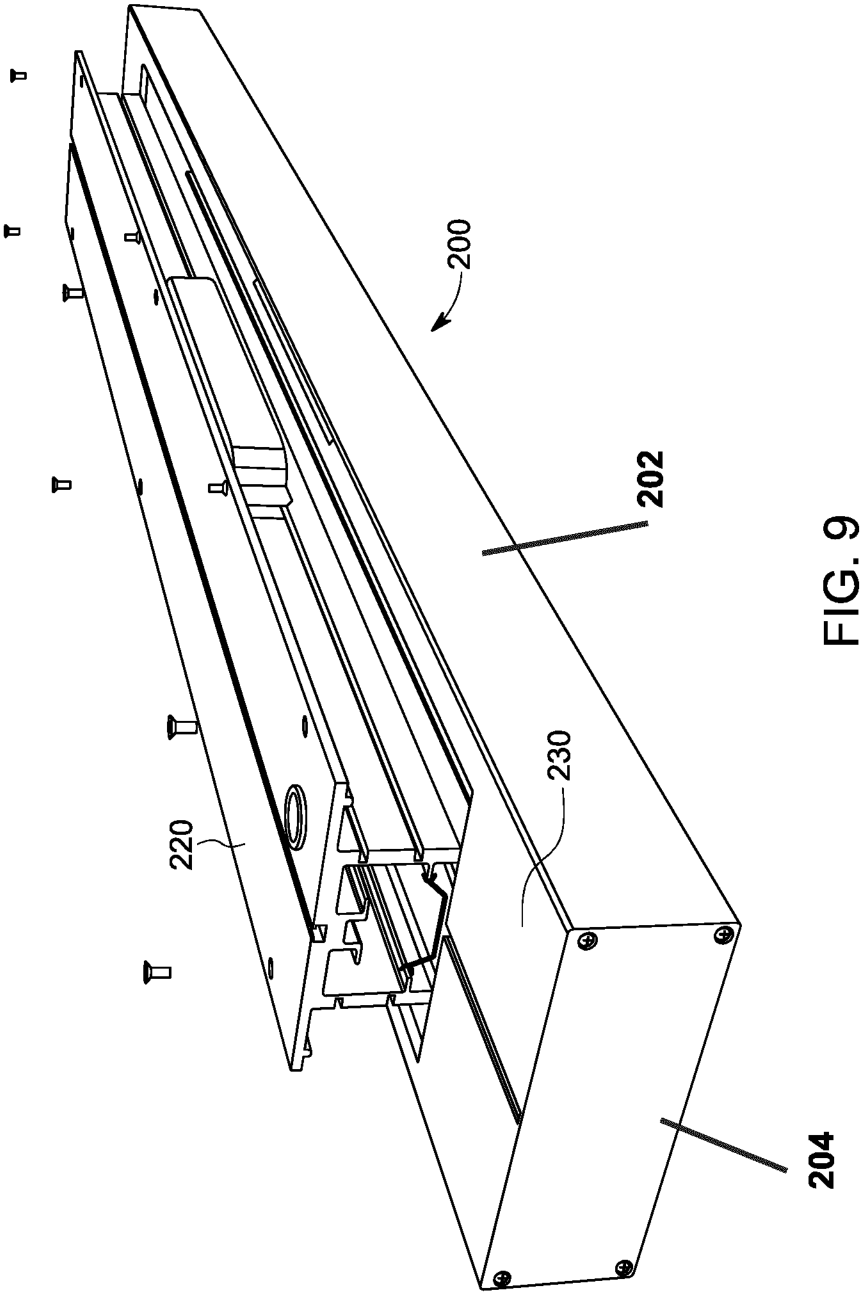
FIG. 9 is a partially exploded perspective view of the troffer fitting of FIG. 8 with an elongate removable gear tray of the fitting partially removed.
Figure 10:
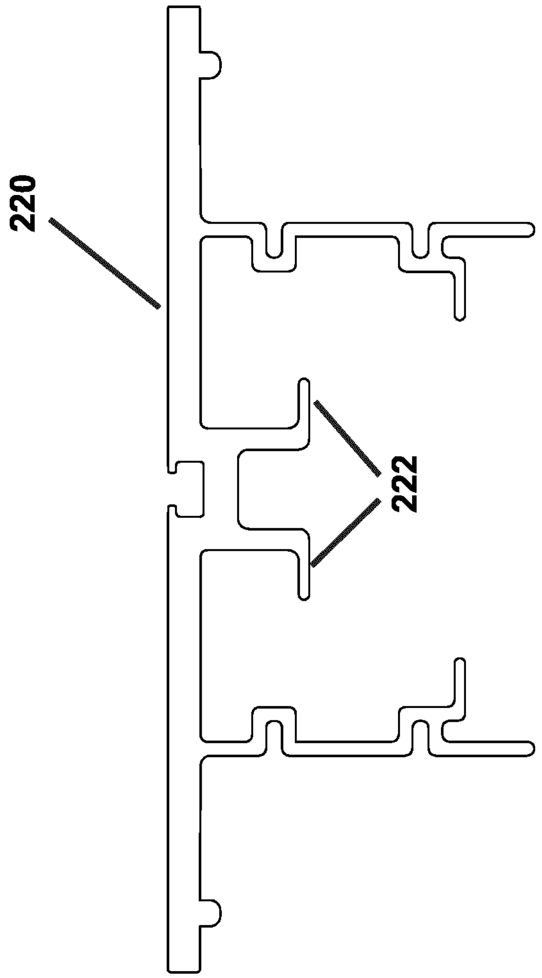
FIG. 10 is a cross-sectional end view of the removable gear tray.
Figure 11:
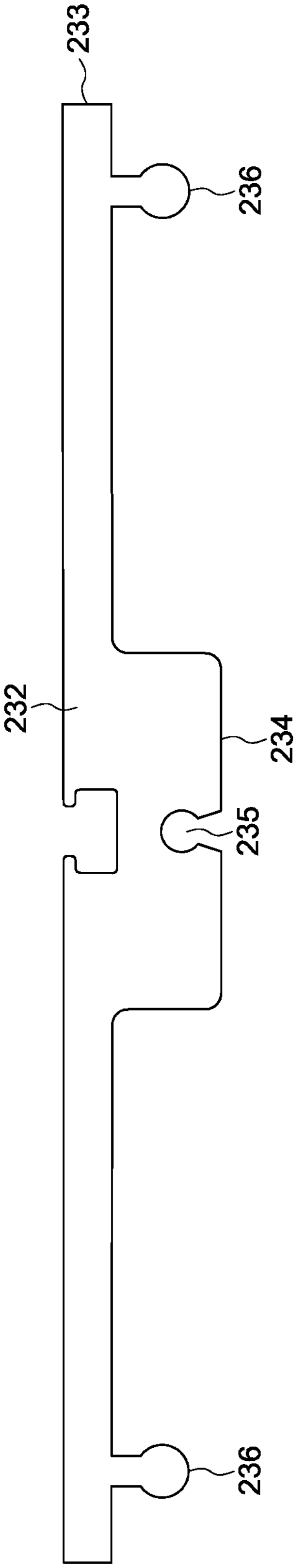
FIG. 11 is a cross-sectional end view of an upper filler plate which is fitted to the upper surface of the troffer fitting at either side of the removable gear tray.

As shown in FIG. 7A, when it is required to have both up lighting and down lighting two gear trays 120 are located in the main body extrusion, one in the lower section 110 and one in the upper section 112. Each gear tray 120 is provided with lighting element 130 and a diffuser lens 118. A diffuser lens 116 is also provided in each of the sections 110 and 112.

The second embodiment 200 of light fitting according to the invention is shown in FIGS. 8 to 12D. It is a troffer fitting which is a fitting which is installed on the support grid of a ceiling from above and the lower surface of the fitting is flush with the ceiling. Although not limiting in any respect, the dimensions of the fitting 200 are 1182 mm in length, 170 mm in width and 60 mm in height. These dimensions can of course be varied depending on circumstances.

The troffer fitting 200 comprises an elongate main body 202 which comprises an elongate extrusion 203 and two end caps 204 a removable gear tray cover 220 and filler plate 230. Attached to the support legs 222 are a pair of retaining lugs 124 of the elongate gear tray 120 which is also used with the first embodiment 100. The elongate gear tray 120 supports the lighting elements 130 as well as the diffuser 118 where required. A clear prismatic lens 116 is provided at the lower face 215 of the main body 202.

Figure 12:
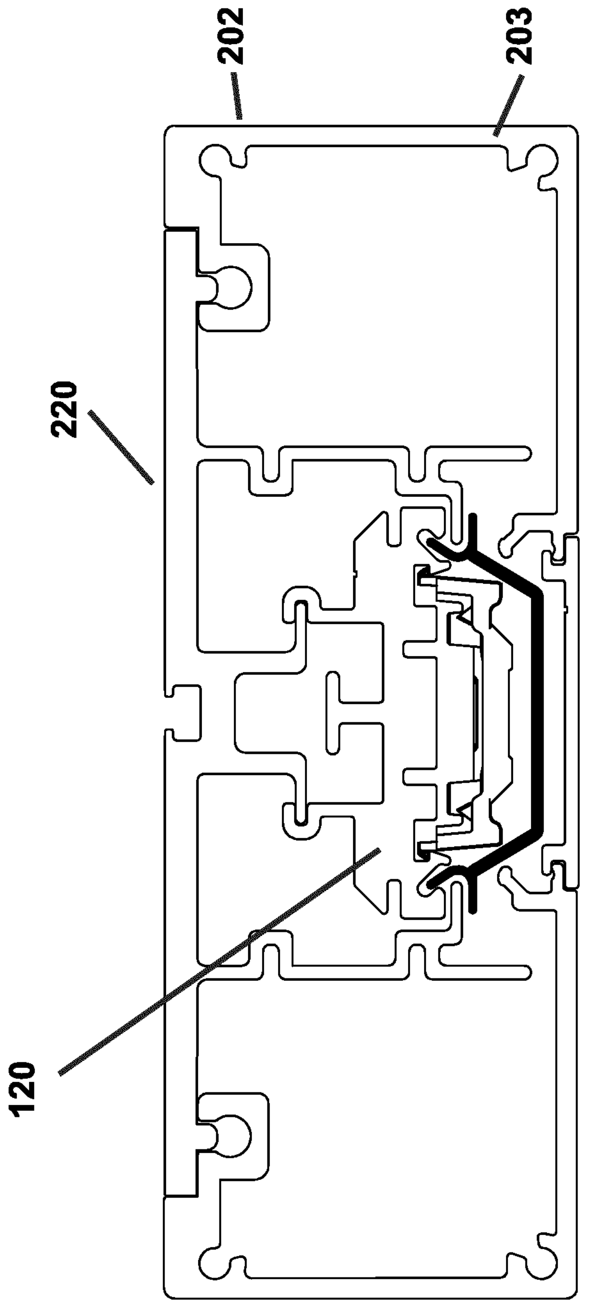
FIGS. 12A, 12B and 12C show a series of three cross-sectional end views of the troffer light fitting
FIG. 12D is a cross-sectional end view of the troffer fitting arrangement for a white light output.
Figure 12A:
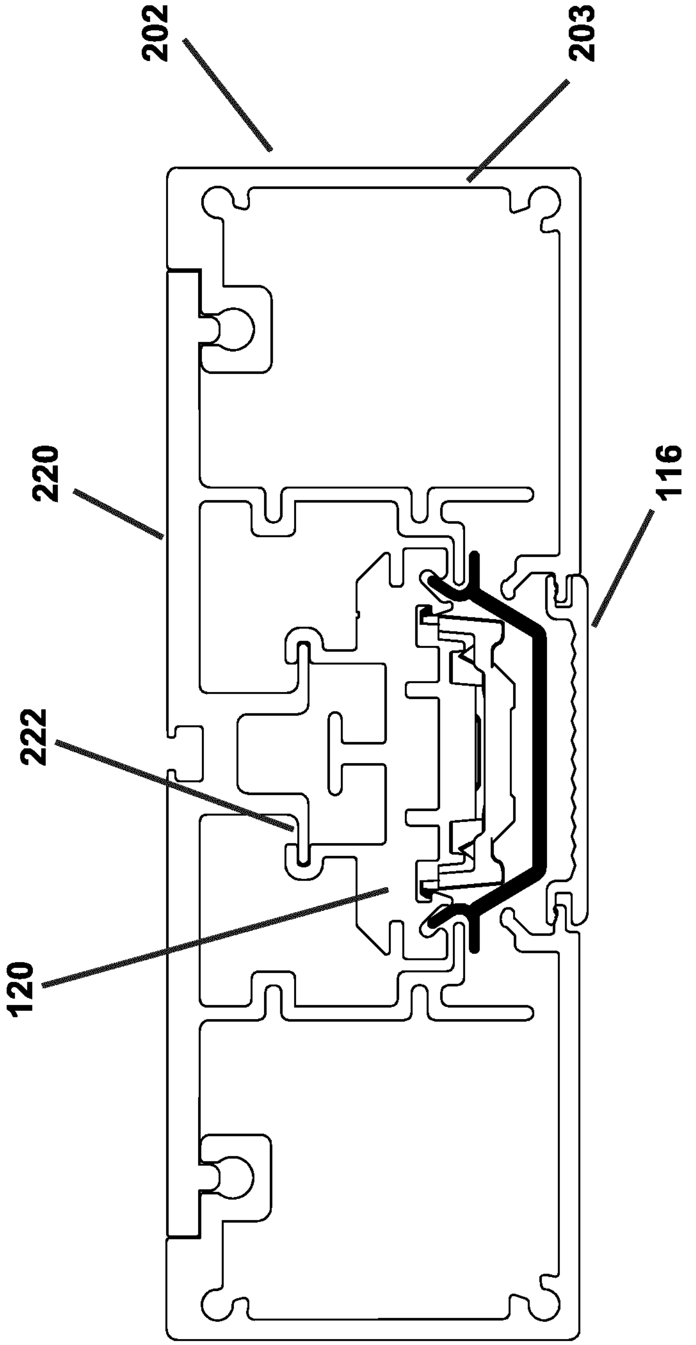
Figure 12B:
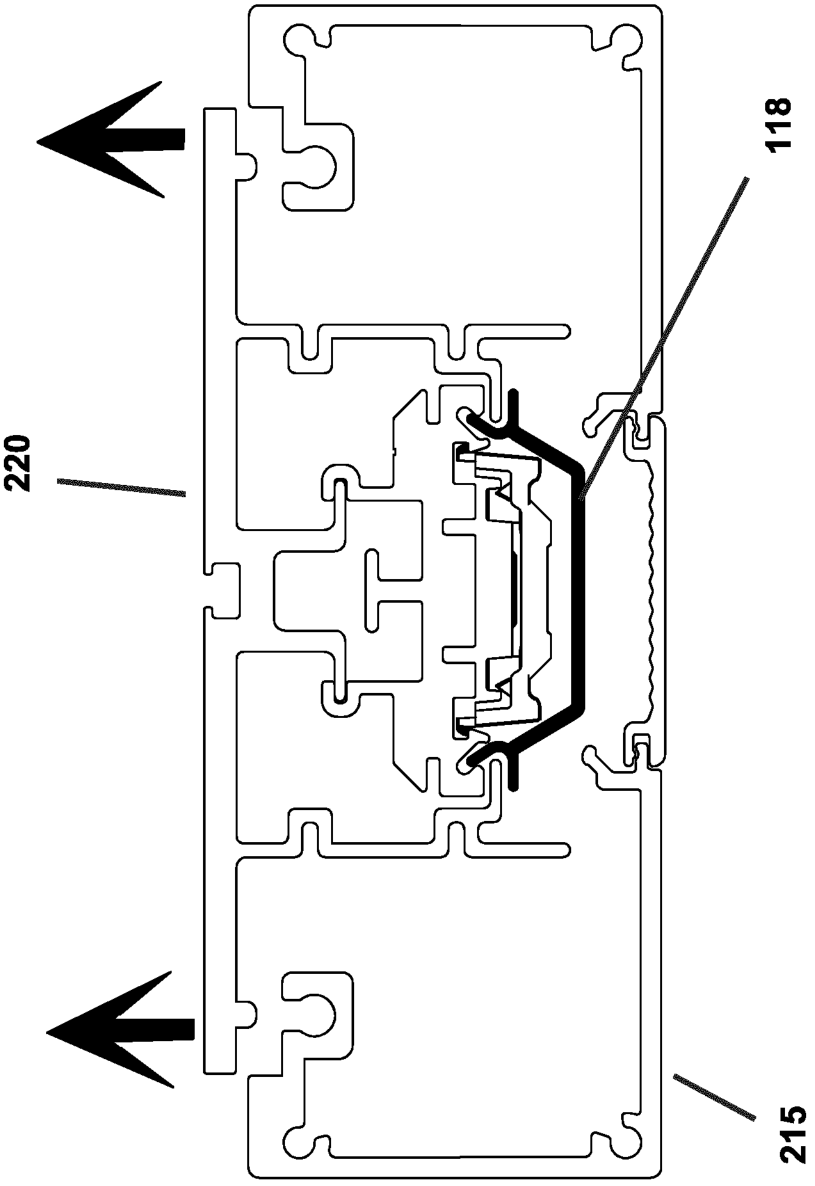
Figure 12C:
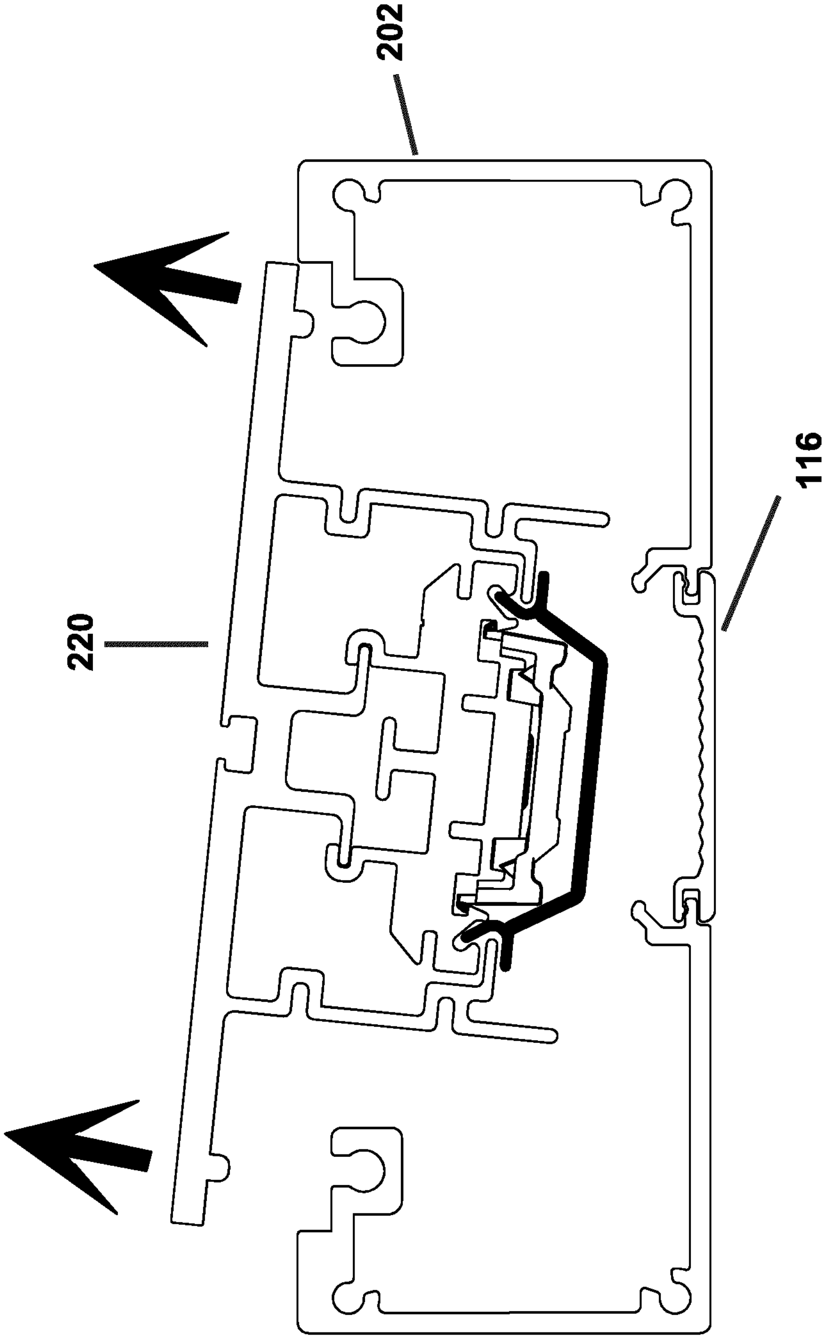
Figure 12D:
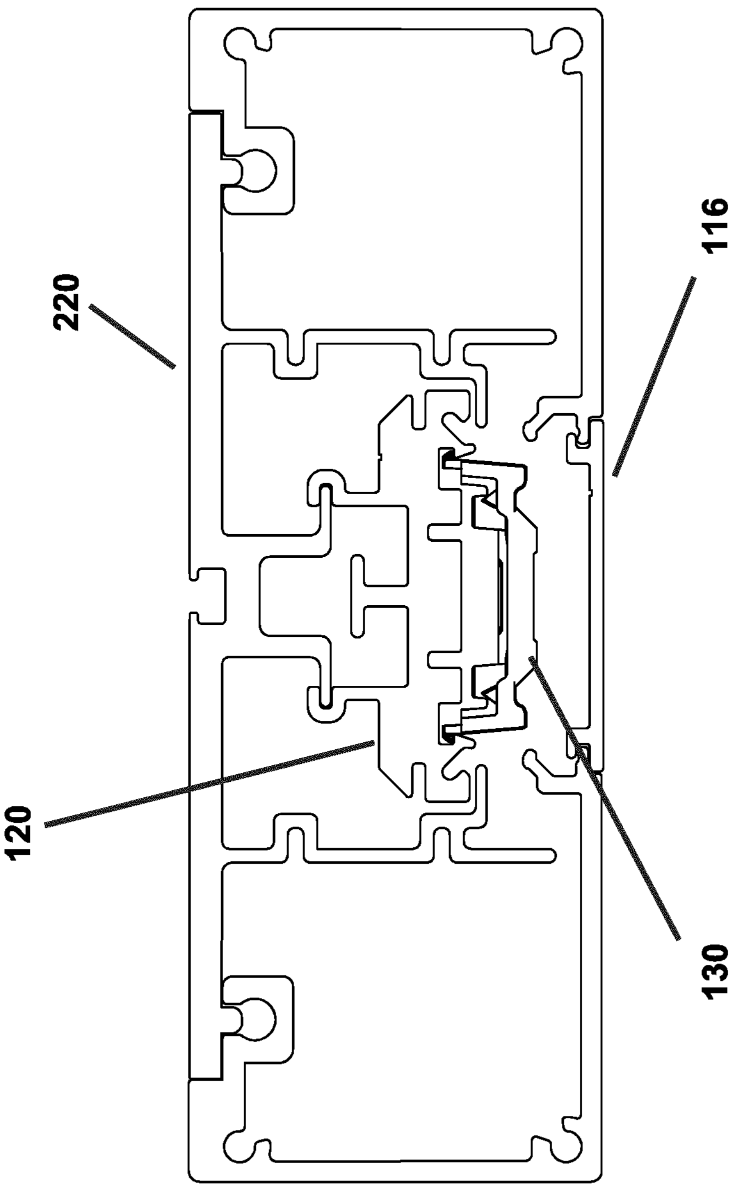

All the electrical and electronic circuitry necessary to operate the light fitting 200 are located and housed on the gear train 220 which is removable from the upper face 222 by simply undoing six screws 224. With the screws 224 removed, the removable gear tray 222 is lifted vertically upwards as shown in FIG. 12B and then tilted to one side to be removed from the light fitting 200.

The fitting 200 is suspended on its lower surface 202 by a ceiling support grid (not shown) above a clean room or other installation. This means that a technician repairing the light fitting can access the light fitting from above without entering the clean room or other installation. Also because of the way the light fitting 200 is designed, there is no danger of any component from the light fitting falling down into the clean room or other installation and possibly injuring a person beneath the light fitting or comprising the spatial integrity of the room or installation.

Referring to FIGS. 13, 13A, 13B, 13C, 13D and 13E, these drawings show the third embodiment of the invention according to the invention namely a wide troffer fitting 300. Although not limiting in any respect, the dimensions of the fitting 300 are 1182 mm in length, 268 mm in width and 60 mm in height. These dimensions can of course be varied depending on circumstances. Apart from the dimensions, the fitting 300 and fitting 200 include the same component parts which are given the like numerals.

The fourth embodiment 400 is shown in FIGS. 14A and 14B is similar to the embodiments 200 and 300 but the extrusion 402 is of a narrower width. All other components are similar and given the same numerals.

It is to be understood that the invention is not limited to the specific details described herein, which are given by way of examples only and various modifications and alterations are possible without departing from the scope of the invention as defined in the appended claims.

The invention claimed is:

1. A multifunctional light fitting comprising:

an elongate main body extrusion, having a generally rectangular cross-section with faces generally at right angles to each other and defining an interior space with at least one of the faces having a lens area;

a second elongate extrusion operable for use as an elongate gear tray;

the second elongate extrusion being engageable within the interior space of the main body extrusion wherein the elongate main body extrusion and the second elongate extrusion define an optical chamber that is exposed to the lens area;

electric lighting elements supported by the second elongate extrusion within the optical chamber, wherein the electric lighting elements provide a lighting output of white light for the multifunctional light fitting;

spectrum specific lenses supported by the second elongate extrusion that converts the lighting output of while light to spectrum controlled light, wherein the second elongate extrusion is selectively positionable within the elongate main body extrusion to selectively transition from the lighting output of white light to the spectrum controlled light.

2. The multifunctional light fitting as claimed in claim 1, in which the second elongate extrusion is removable from the interior space of the elongate main body extrusion for maintenance or repair of the electrical lighting elements.

3. The multifunctional light fitting as claimed in claim 2, in which the elongate main body extrusion has two separate interior spaces, each of which has support ledges for a second elongate extrusion, with the electric lighting elements, wherein a lighting output is selectively produced within each of the two separate interior spaces or both.

4. The multifunctional light fitting as claimed in claim 1, in which the interior space is provided with elongate support ledges and the second elongate extrusion is provided with complementary elongate channels that engage the elongate support ledges.

5. The multifunctional light fitting as claimed in claim 1, in which the second elongate extrusion has at least two upstanding lugs, the multifunctional light fitting further comprising a cover plate having complementary support legs which engage with the upstanding lugs.

6. The multifunctional light fitting as claimed in claim 1, in which the electric lighting elements comprise collimated optics having a range of distributions.

7. The multifunctional light fitting as claimed in claim 1, which includes at least one sensor, to control operation of the multifunctional light fitting.

8. The multifunctional light fitting as claimed in claim 1, which is operable using power supplied by a power source selected from a group comprising a mains power supply and power over ethernet.

9. The multifunctional light fitting as claimed in claim 8, further including quick connect connections so that the multifunctional light fitting can be connected and disconnected quickly from said power source.

10. The multifunctional light fitting as claimed in claim 1, is a ceiling light fixture.

11. The multifunctional light fitting as claimed in claim 1 further including an emergency lighting means for activation in the event of a power failure.

12. The multifunctional light fitting as claimed in claim 1, which is of a slim and narrow design to ensure optimum air flow return in controlled environments.

13. The multifunctional light fitting as claimed in claim 1, in which the second elongate extrusion comprises an extruded anodized profile to accommodate various optical distributions.

* * * * *